Feb. 18, 1958 SATOSHI T. TADO 2,824,177

HEARING AID AMPLIFIER

Filed Oct. 11, 1955

SATOSHI T. TADO
INVENTOR.

BY Silverman & Mullin
Att'ys

United States Patent Office 2,824,177

Patented Feb. 18, 1958

2,824,177

HEARING AID AMPLIFIER

Satoshi T. Tado, Chicago, Ill., assignor to Martin Hearing Aid Company, Chicago, Ill., a corporation of Illinois Application October 11, 1955, Serial No. 539,844

2 Claims. (Cl. 179—107)

This invention relates generally to hearing aid amplifiers and particularly is concerned with a hearing aid amplifier using transistors and thereby rendered light in weight and economical of operation.

It has been known to use transistors in hearing aid circuits, but for the most part the circuits have been expensive because of a great number of components, and in addition, have been too sensitive to changes in temperature. The principal object of this invention is to provide a transistorized hearing aid amplifier which uses less components than previously, and which by virtue of novel circuitry, uses only one battery and provides stable, efficient, and reliable performance under varying conditions of temperature and use.

As well-known, problems of applying transistors to use in amplifiers for hearing aids are complicated by their temperature sensitivity, the variations in their parameters with operating point, and the low input impedance. The choice of circuitry and the value of the components thereof in the case of hearing aids must take into consideration a compromise between number of elements and gain because the user does not want any more weight than necessary, especially in the case of women. In the solution of these problems, the invention herein has achieved the desired results by using a single voltage dividing network for biasing more than one transistor, by a novel arrangement for biasing a transistor through a volume control, and by an arrangement of other elements of the circuit operating together in a manner to be described.

Figure 1:
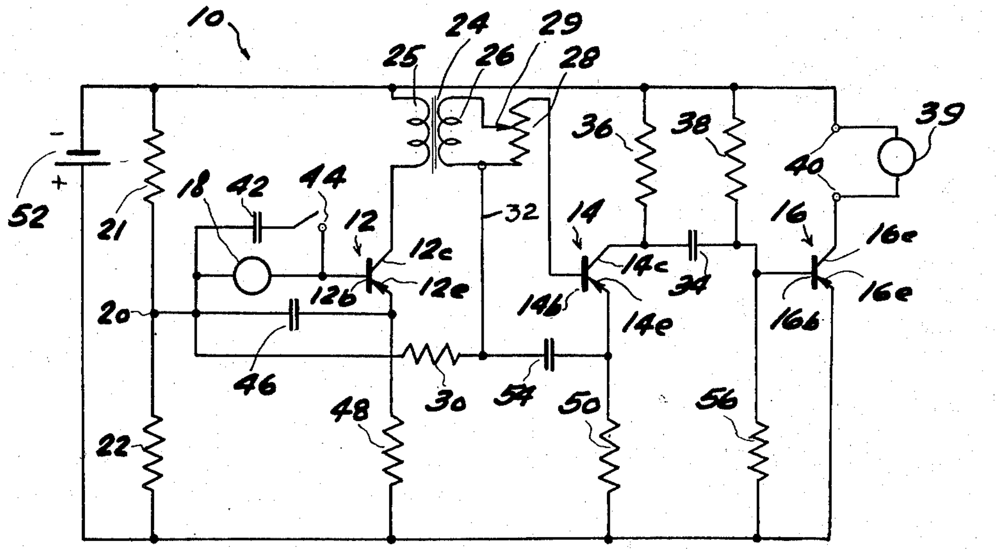
Fig. 1 is a circuit diagram of a three transistor amplifier using my new circuit.

In Fig. 1 I have shown an amplifier 10 using three transistors, the first comprising the first stage and being driven by the magnetic microphone 18 of conventional construction, connected between the base 12*b* and the tap 20 of the voltage divider formed by the resistors 21 and 22. The microphone 18 is referred to in the claims appended as an audio translating device since it changes sound into electrical energy. Obviously any audio device, such as the output of a radio circuit or the like is the equivalent of 18. The second stage is transformer coupled through a transformer 24 whose primary winding 25 is connected directly between the collector 12*c* and the upper end of the voltage divider 21—22. The secondary winding 26 is shunted by a part of a volume control potentiometer 28, the slider 29 of which is connected to one end of the secondary winding. The full resistance of the potentiometer 28 is connected between the base 14*b* and the tap 20 of the voltage divider 21—22 through a resistor 30. The second end of the secondary winding 26 is similarly connected by way of the common lead 32.

The third stage is the output stage and it is R.-C. coupled with the second stage through the capacitor 34 which connects between collector 14*c* and base 16*b*. Resistor 36 controls the voltage on the collector 14*c* and the resistor 38 controls the output current of the third stage.

The output of the third stage is connected directly into the magnetic receiver or speaker 39 at the terminals 40, from the collector 16*c* to the upper end of the voltage divider 21—22.

The microphone 18 is shunted by a capacitor 42 which may be connected in or out of the circuit by the switch 44 which gives a measure of tone control. The high frequency response is decreased thereby. This eliminates a good deal of noise, if in the circuit. The capacitor 46 connects from the microphone 18 to the emitter 12*e* to prevent the low frequency response of the amplifier from being affected by the reactance of the microphone.

The biases of the first two transistors 12 and 14 are acquired through the medium of a single voltage divider 21—22 connected across a battery 52 which may consist of one or more cells. For the circuit constants to be given in the example hereafter, the battery provided one and one half or two volts and was of the mercury type. The resistor 48 is a voltage dropping resistor for adjusting the voltage of the emitter 12*e*. The direct current path for the bias of the base is through the microphone 18 and the primary 25 of the transformer.

Voltage is applied to the base 14*b* through the resistor 30 and the volume control 28. This is believed most unusual as an arrangement for eliminating the need for a second voltage divider while not seeming to sacrifice stability. The capacitor 54 is another by-pass capacitor, and the resistor 50 is a voltage dropping resistor for enabling proper emitter bias to be obtained.

In view of the complex nature of the characteristics of the transistor, an exact explanation of why the seemingly stripped circuit operates as well as it does, especially in view of the elimination of a voltage divider for the bias of the second transistor, may not be made. I believe that the arrangement is in some manner self-compensating, and hence gives good stability and frequency response. I do not wish to be bound by any particular theory, but only desire to be covered structure-wise.

The difficulties of achieving good volume control between transformer coupled stages arise because of impedance matching requirements. The ordinary circuits will cause large variations in input impedance which cannot be tolerated because the transistor has such low impedance input. The unusual arrangement shown provides substantially constant impedance for the input to the transistor 14 and hence achieves a measure of stability accomplished only through the use of complex and expensive volume control arrangements. Note the absence of a coupling capacitor between 12 and 14.

The commercial version of the amplifier above described used the following circuit constants:

Resistors:

| | |
|---|---|
| **21** | 8,200 ohms. |
| **22** | 2,700 ohms. |
| **30** | 47,000 ohms (or 27,000 ohms). |
| **36** | 2,700 ohms. |
| **38** | 47,000 ohms. |
| **48** | 470 ohms. |
| **50** | 470 ohms. |

Capacitors:

| | |
|---|---|
| **34** | .1 microfarad. |
| **42** | 4 microfarads. |
| **46** | 4 microfarads. |
| **54** | 4 microfarads. |

Transistors:

| | |
|---|---|
| **12** | CX 784 (Raytheon). |
| **14** | CX 784. |
| **16** | CX 785. |

The volume control potentiometer 28 was 10,000 ohms. I have found that increased stability can be achieved, together with increased gain, but at a sacrifice of light weight and through the addition of another component, by shunting the emitter 16*e* with a large resistor 56, of about 15,000 ohms and by increasing the voltage of the battery 52 to two and a half volts.

Figure 2:
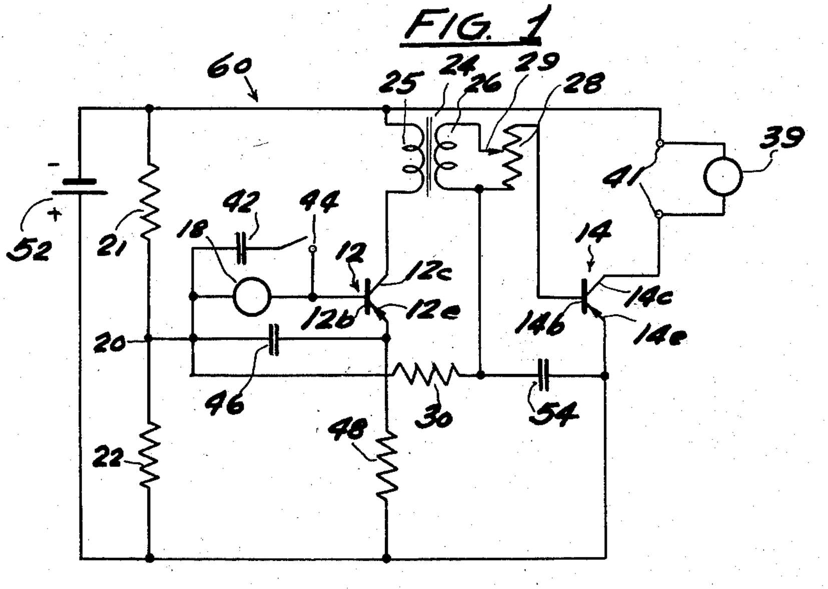
Fig. 2 is a circuit diagram of a two transistor amplifier using my new circuit.

In Fig. 2 there is illustrated a circuit diagram of the same amplifier described above, except that the output stage of the amplifier 10 has been eliminated. The amplifier 60 is thus smaller, more economical, having eliminated at least one transistor, one capacitor and several resistors. Obviously the power output is less, but the stability and frequency response are of the same order as those of the amplifier 10 since the novel features of the previous circuit are included.

The collector 14*c* is connected directly to the upper end of the voltage divider 21—22 through the output terminals 41 across which the receiver 39 is connected as a load. This differs from the amplifier 10 in that the load of amplifier 10 may be considered the resistor 36 so that the audio signal couples with the base 16*b* through capacitor 34. The resistor 38 is therefore a bias resistor and part of the third stage.

It is pointed out that resistors 48 and 50 lend stability to the amplifier in both examples, and that the same volume control is used also.

It is believed that the invention has been sufficiently described to enable one skilled in the art to which same appertains to understand and practice the same without the need for further explanation.

What it is desired to secure by Letters Patent of the United States is:

1. In an amplifier for hearing aids and having at least a first and second transistor stage with transformer coupling means therebetween, a source of D. C., a single voltage divider across said source, the stages each having at least one transistor therein, said transistors each having a base, a collector and an emitter, with the emitters of each transistor connected to one end of said voltage divider, and the collectors of each transistor connected to a second end of said voltage divider, the first collector having a part of said transformer coupling means in its connection and the second collector having a load in its connection, each of the bases having a current path between it and a tap between the ends of said voltage divider, the path of the first base having an audio translating device therein, the path of the second base having resistance means therein, said transformer coupling means having a primary winding and a secondary winding, and said part thereof comprising said primary winding, said resistance means including a potentiometer having a resistance unit all of which is connected in said path of the second base, said potentiometer including a sliding contact to provide volume control for said amplifier by adjustment thereof along said resistance unit, and the said secondary winding being connected between the said contact and one end of said resistance unit.

2. An amplifier as described in claim 1 in which said resistance means also includes a biasing resistor which is connected in the path of the second base between said potentiometer and said tap, said one end of said resistance unit being common with a terminal of said biasing resistor.

References Cited in the file of this patent

UNITED STATES PATENTS

| | | |
|---|---|---|
| 2,585,077 | Barney | Feb. 12, 1952 |
| 2,613,382 | Scaife | Oct. 7, 1952 |
| 2,647,958 | Barney | Aug. 4, 1953 |
| 2,660,624 | Bergson | Nov. 24, 1953 |
| 2,680,160 | Yaeger | June 1, 1954 |

OTHER REFERENCES

Shea text, "Principles of Transistor Circuits," pp. 102–124, pub. 1953 by John Wiley & Sons, Inc., N. Y. C.